Feb. 21, 1939.  E. G. CHAMBERS  2,147,881
CONTROL APPARATUS
Filed Feb. 21, 1938  2 Sheets—Sheet 1
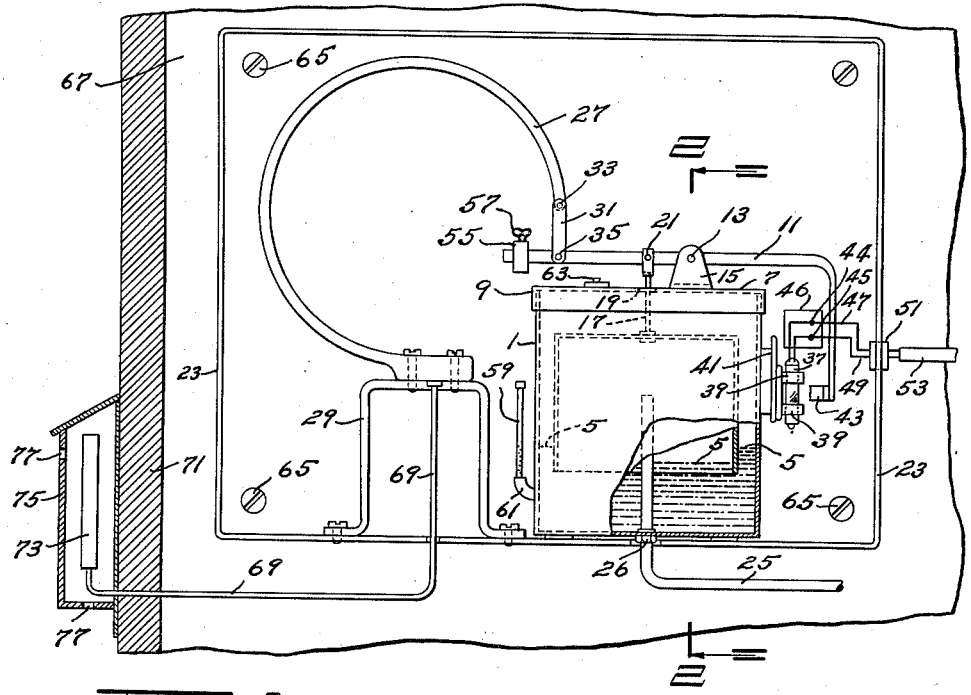
FIG. 1.
FIG. 2.
FIG. 3.
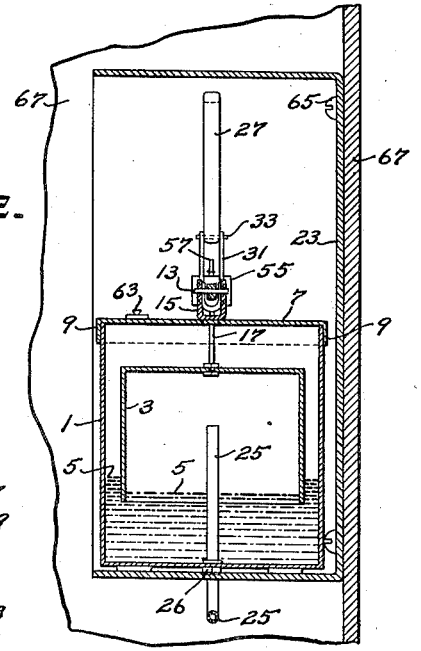
INVENTOR.
Edward G. Chambers
BY
H. D. Hicks
ATTORNEY.

Feb. 21, 1939.   E. G. CHAMBERS   2,147,881
CONTROL APPARATUS
Filed Feb. 21, 1938   2 Sheets-Sheet 2
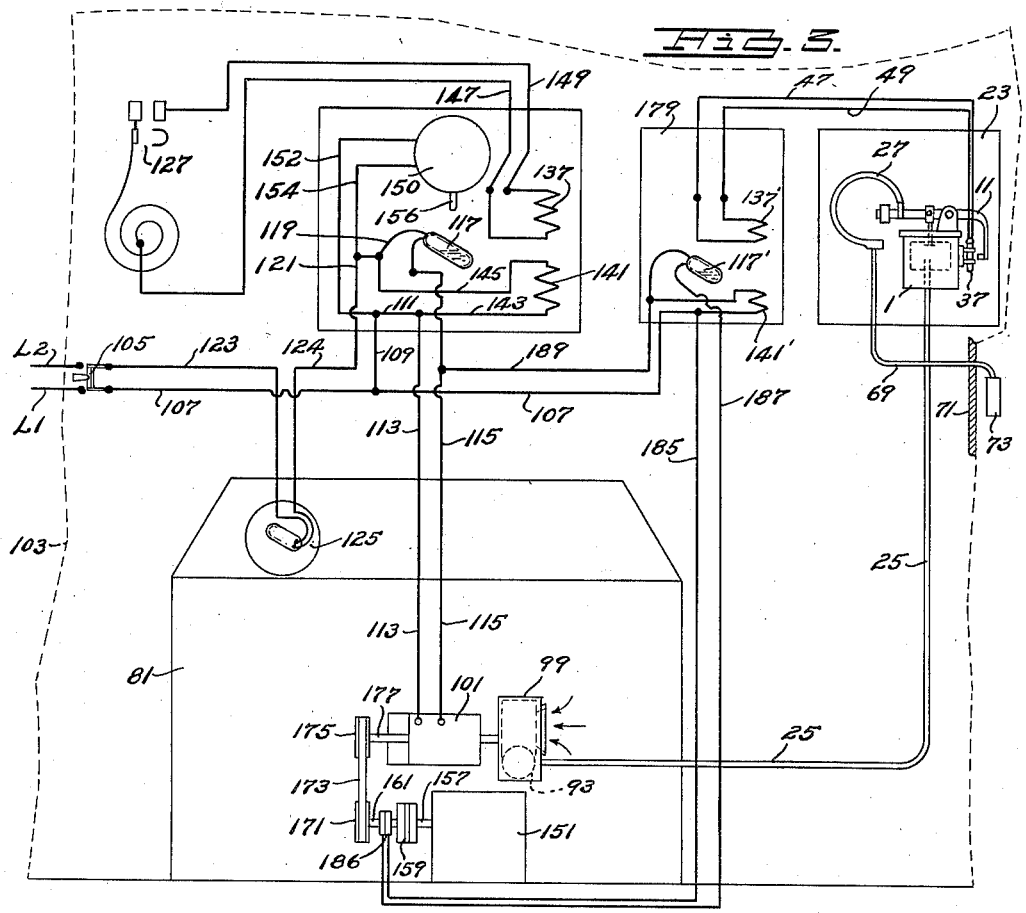
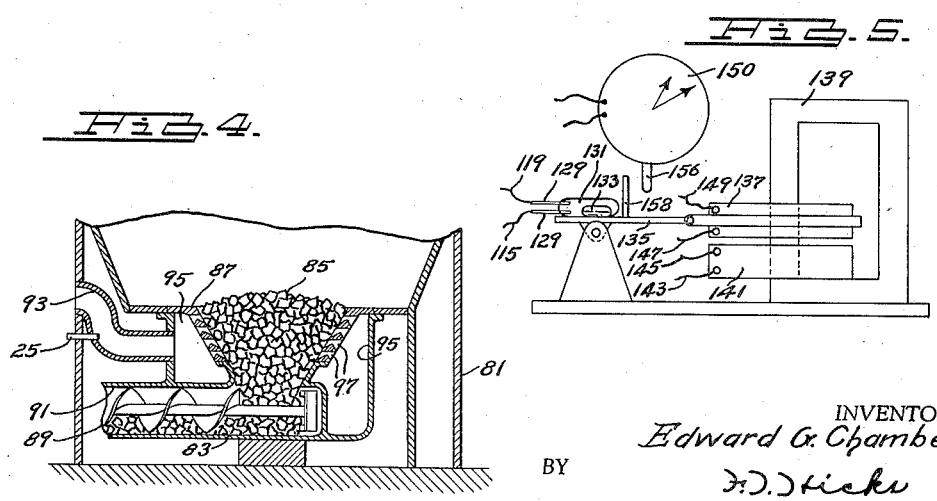
INVENTOR.
Edward G. Chambers
F. D. Hicks
ATTORNEY.

Patented Feb. 21, 1939

2,147,881

UNITED STATES PATENT OFFICE 2,147,881

CONTROL APPARATUS

Edward G. Chambers, Toledo, Ohio, assignor to The Indemse Corporation, a corporation of Michigan Application February 21, 1938, Serial No. 191,720

7 Claims. (Cl. 236—91)

My invention pertains to a method of and means for controlling the operation of automatic stoker fired furnaces, and more particularly to furnaces of the type used for heating residences and other buildings.

I am aware that in some previously known stoker systems, arrangements have been provided which purport to apportion the air supply to the rate of fuel consumption, or to regulate the speed of fuel feed as some function of the outside temperature, or to maintain a constant pressure of air supplied in the wind-box. However, such previously known systems require frequent attention and manual adjustment as the heat load conditions vary, fail to provide efficient combustion conditions under varying load conditions, and are complicated to adjust and maintain. For such reasons the prior systems have been especially unsatisfactory for controlling stoker-fired furnaces for heating homes and other buildings, where skilled attention is not available at all times.

It is accordingly an object of my invention to provide an improved method of, and means for, controlling the operation of automatic stoker-fired furnaces wherein the wind-box pressure is automatically varied inversely as the outside temperature varies, while the fuel feeding rate is varied with the wind-box pressure, thus providing the proper depth of fuel bed for optimum combustion conditions under all the different load conditions that must be satisfied by the furnace and which also operates to eliminate blow-holes and also to prevent feeding the furnace full of fuel after a fire is extinguished.

It is also an object of my invention to provide an improved method of controlling the operation of an automatic stoker-fired furnace which consists in, feeding a solid fuel into the furnace to provide a fuel bed therein, supplying air into the furnace and passing it through the fuel bed at super-atmospheric pressure, regulating the air supply in response to the temperature of a space to be heated, producing a control force corresponding to a function of the outside atmospheric temperature, producing a second controlling force corresponding to the air flow resistance of the fuel bed, and then coordinating the control forces and applying the resultant control force for controlling the rate of fuel feed.

It is a further object of my invention to provide a sensitive coordinating stoker control instrument of simple construction for accurately combining control forces which are produced corresponding to factors in the operation of a stoker to provide a coordinated control effect for controlling the operation of a stoker.

Another object of my invention is to provide an improved stoker control system comprising the combination of a furnace, a fuel feeder for feeding solid fuel to provide a fuel bed therein, an air supply source for supplying air at super-atmospheric pressure to pass through said fuel bed, an enclosure heated by the furnace, a device responsive to the temperature in the enclosure to control the air supply and rate of combustion, control means effective as a function of the outside atmospheric temperature, control means effective as a function of the thickness of the fuel bed, a regulating member mutually responsive to both of said control means for coordinating the control effects thereof, and means controlled thereby for regulating the rate of fuel feed.

The sensitive coordinating stoker control instrument and the method of controlling a stoker accomplished by its operation are claimed in my copending divisional patent application, Serial No. 232,937, filed October 3, 1938.

Further objects and advantages are within the scope of my invention such as relate to the arrangement, operation and function of the related elements, to various details of construction and to combinations of parts, elements per se, and to economies of manufacture and numerous other features as will be apparent from a consideration of the specification in conjunction with the drawings disclosing a form of my invention, which may be preferred, in which:

Fig. 1 is a side elevational view showing my sensitive coordinating stoker control instrument;

Fig. 2 is a sectional view taken on line 2—2 of Fig. 1;

Fig. 3 is a diagrammatic view schematically representing a complete stoker control system arranged to provide the optimum conditions of combustion, in accordance with my invention;

Fig. 4 is a fragmentary sectional view showing the combustion retort in the furnace with the air conduit arrangement for blowing air through the fuel bed providing an air pressure which corresponds to the air flow resistance of the fuel bed;

Fig. 5 is an elevational view partially diagrammatic, showing the cooperative relation of the parts of one of the transformer-relay instruments used in the control system; and Fig. 6 is a diagrammatic view showing a different embodiment of control apparatus responsive to the velocity of air flowing in the stoker supply conduit.

Referring more particularly to Figs. 1 and 2 of the drawings, my sensitive coordinating stoker control instrument comprises an open top vessel 1 which may be made of any suitable material, but for this purpose I preferably provide a vessel of sheet metal which is suitably punched out in a manner well known in the art of sheet metal working. The vessel 1 receives a hollow bell-element 3 of inverted cup shape which is disposed with its open edges downward in the vessel for immersion in a quantity of liquid 5 which floats the bell-element and provides a seal around its lower edges. The vessel 1 and the enclosed bell-element 3 may be of any suitable cross section either circular or rectangular, and the dimensions are suitably chosen so that the bell-element moves freely on the liquid without causing frictional engagement on the side walls of the vessel to interfere with the accuracy and sensitivity of the instrument. A cover 7 is removably disposed on the open top of the vessel, and it is secured in position by a marginal flange 9 turned downwardly from the periphery of the cover around the upper open edges of the vessel.

For coordinating the various control forces which are generated as a function of certain factors related to the operation of a stoker, I provide a movable regulating member comprising a lever arm 11. The regulating lever arm 11 is pivotally journalled on a pivot 13 which is mounted on an upstanding bracket 15 on top of the cover. For transmitting control forces from the bell-element 3, a metal link 17 is secured thereto in any suitable manner, and extendng loosely through an aperture 19 in the cover 7, it is pivotally connected at its upper end to the regulating lever arm 11 by means of a pivot pin 21 extending therethrough.

The instrument is mounted in an instrument box 23, which is preferably a strong sheet metal box, similar to boxes usually provided for housing electrical switches, and the vessel 1 is secured to the bottom thereof in any suitable manner. A small air control conduit 25 passes through the center of the bottom of the vessel, into which it may be secured and hermetically sealed by a suitable bushing 26, and it extends upwardly therein opening at its upper end into the cavity of the bell-element 3. From the instrument box 23, the conduit 25 extends for connection into the wind-box or air conduit of a stoker to be controlled, in a manner to be subsequently described.

Adjacent the vessel 1, I mount a Bourdon tube 27 with one end thereof rigidly supported on a bracket 29 which rises up from the bottom of the instrument box. The bracket 29 is secured to the bottom of the instrument box in any suitable manner, and in a proper position to project the movable end of the Bourdon tube 27 over the regulator lever arm. A link 31 connects from a pivot pin 33 in the movable end of the Bourdon tube to a pivot pin 35 extending through the regulator arm 11 for influencing the operation of the regulator in accordance with varying fluid pressures applied in said tube corresponding to a variable condition effecting the operation of the stoker system, which will be subsequently described.

By this construction the regulator arm 11 is arranged for receiving and coordinating two different forces generated in accordance with the fluid pressures applied separately into the bell-element 3 and the Bourdon tube 27, in accordance with two different variable conditions.

For actuation by the regulator arm 11, any suitable control means of a delicate nature may be associated therewith, such as any delicate electrical circuit making and breaking means usually used with delicate instruments. For this purpose I preferably utilize a sealed mercury contact magnetic switch, of the type sold on the market as Mercoid #9–81 for example, and the glass tube 37 of the switch is mounted externally in spring clips 39 projecting from a bracket 41 on one side of the vessel 1. Such a magnetic switch is actuated by merely moving a magnet 43 adjacent thereto, in a well known manner. To support the actuating magnet 43, one end of the regulator arm 11 of my instrument is turned down adjacent the switch tube 37 and the actuating magnet 43 is secured thereon in any suitable manner. When the sum of the coordinated control forces exceeds a predetermined value on the arm, the magnet 43 moves nearer the switch tube 37, the switch is actuated and completes a connection between two wires connecting with two terminals 44 and 45 on a board in the instrument box. From the terminals two insulated wires 47 and 49 extend from the instrument box through a bushing 51 into a conduit 53 for connection into the stoker system to accomplish a desired operation.

To adjust the instrument to suit the operating characteristics of any particular installation or fuel, I provide means for applying a variable biasing force on the regulator arm, such as a weight 55 slidable thereon and secured with a thumb screw 57 in any adjusted position.

Any suitable liquid may be used in the vessel, but I prefer to provide a light oil for this purpose. To provide a convenient indication whereby the attendant may readily ascertain the level of the liquid, I provide a glass tube or gauge 59 which is vertically supported on an elbow 61 which connects through the side wall of the vessel 1 below the liquid level to be maintained. For convenience in charging the liquid therein, a vent 63 is provided in the cover 7. The instrument box 23 may be mounted in any suitable location adjacent the stoker, as by screws 65 passing through the back wall of the box into a wall 67 of the building.

From the stationary end of the Bourdon tube in my sensitive stoker control coordinating instrument, a small conduit 69 extends downwardly through the bottom of the instrument box and through an outside wall 71 of the building for connection with a thermo-bulb 73. The thermo-bulb is mounted in an outside housing 75 having vents 77 to permit the air to circulate freely therethrough, and it contains an expansible fluid suitably selected to provide a varying range of pressure corresponding to the range of temperatures of the outside atmosphere, as will be understood.

Referring more particularly to Fig. 3 of the drawings, I have shown the application of my sensitive stoker coordinating control instrument installed in a control system to regulate the operation of a stoker-fired furnace 81, which may be any conventional type of furnace such as steam, vapor, hot air or hot water furnaces used for heating. Into the furnace solid fuel 83 is fed automatically to provide a suitable fuel bed 85 in the fire pot 87, as shown in Fig. 4. For this purpose any conventional type of stoker may be utilized. Such stokers comprise a feeder, such as a screw 89, for feeding the solid fuel in through a passage 91 and up into the retort 87. Air conduit means which is associated with the retort for supplying combustion air thereto, comprises an air supply pipe 93 connecting into an annular chamber 95 surrounding the fire-pot for transmitting air thereto under super-atmospheric pressure, from any suitable source. The air passes through the pipe 93 into the annular chamber 95, and thence through small tuyère openings 97 through the side walls of the retort and then upwardly through the fuel bed 85 therein.

When air is supplied a static or back pressure of air is created in the air conduit passages 93 and 95 by the air flow resistance of the fuel bed. The air pressure created in the air conduit is thus proportional to or a function of the thickness of the fuel bed, and a conduit 25 connects from the air conduit of the stoker to apply this static pressure in the control instrument.

As represented in Fig. 3, the air supply source may consist of any suitable air impeller such as a fan or blower 99 of the sirocco type from which the air conduit 93 is connected into the furnace. A suitable electric motor 101 is operatively connected with the air impeller for driving it to supply the proper amount of air to heat an enclosure 103 represented by the dotted lines.

To regulate the rate of combustion in accordance with the heat load on the furnace, the electric motor 101 is energized from any convenient alternating current main service line L1, through a main switch 105 and by way of conductors 107, 109, 111 and 113 connecting to one side of the motor. From the other side of the motor the energizing circuit continues by way of a conductor 115 connecting through an automatic control switch 117 and thence through conductors 119, 121 and 124 through limit switch 125, conductor 123 main switch 105 and to the other main line L2. The thermal limit switch 125 of any suitable construction, is mounted on the furnace to prevent overheating thereof, as when starting a fresh fire when the enclosure to be heated is cold.

The automatic switch 117, which controls the motor according to the heat required, may be an electromagnetic switch or relay operated by a thermostatic switch 127 exposed to the air in the heated enclosure, in any well known manner. As shown in Figs. 3 and 5, the automatic switch 117 may be of the well known "transformer-relay" type comprising a pair of contacts 129 sealed into a glass tube 131 containing mercury 133 and tiltably mounted on a pivoted arm 135 which is connected at the movable end to a coil 137 which moves loosely over an iron core 139. A stationary coil 141 on the core is connected to be continuously energized from the main line through an energizing circuit which may be traced from the main line conductor L1 by way of main switch 105, conductors 107, 109, 111, 143 through the winding 141, thence returning by way of conductors 145, 121, 124 limit switch 125, conductor 123 through the main switch 105 to the other main line L2. The movably mounted secondary coil 137 of the transformer-relay is connected through conductors 147 and 149 to the contacts of any conventional thermostatic room switch 127 exposed to the air in the room to be heated.

To start the blower 99 for three minutes every hour to prevent "out fire" in warm weather, a timer 150 is mounted adjacent the automatic control switch 117. The timer comprises a well known construction commonly provided in stoker systems and it consists of a synchronous electric clock motor which is energized continuously through conductors 152 and 154 connecting from 109 and 121 respectively. At regular intervals, a finger 156 engages a lug 158 on the arm 135 of the control switch 117 and holds it in deflected position for several minutes which operates the blower even though there is no demand for heat.

The transformer action of the transformer-relay continuously energizes the thermostat circuit 147, 149 and when the contacts of the thermostat 127 are closed by the temperature of the enclosure attaining the desired minimum, the movable coil 137 is short-circuited and because of the current flowing therein it is repelled from the stationary coil 141. This action operating the switch 117 and starting the blower motor 101 in a well known manner, causes the rapid combustion in the retort to supply the heat required. When the desired maximum temperature is attained, the thermostatic switch 127 opens and the transformer-relay opens its switch 117 to stop the blower motor.

The coal feeding mechanism for driving the coal feeder screw 89 comprises a gear box 151 containing a speed reducing gear of any well known construction (not shown). From the gear box 151 a drive shaft 157 extends to an electromagnetic clutch 159, of any well known construction, from the other side of which a shaft 161 carries a belt pulley 171 driven by a belt 173 from a pulley 175 on the shaft 177 of the air impeller motor 101.

To regulate the rate of fuel feed to provide a fuel bed of proper thickness for ideal combustion under all load conditions, the electromagnetic clutch 159 is controlled by a second transformer-relay 179 which may be similar to that previously described, the primary stationary coil 141' of this transformer-relay being connected permanently to the main line, so that it is continuously energized.

The energizing circuit for the stationary primary coil 141' may be traced from the main line conductor L1 through the main switch 105 thence by way of conductor 107 to the coil 141' and returning through conductors 189, 115, switch tube 117 of the automatic control switch, thence by way of conductors 119, 121, 124, thermal limit switch 25, conductor 123, and main switch 105 to the other main line L2.

The movable secondary coil 137', of the second transformer-relay 179, is connected through the conductors 47 and 49, which as previously set forth, connect from the contacts of the switch tube 37 on the coordinating stoker control instrument. The contacts of the tilting mercury tube 117', of the second transformer-relay, are connected in circuit making and breaking relation in the circuit of the clutch 159. This circuit may be traced from main line conductor L1 through switch 105, conductors 107 and 185 to the clutch slip rings 186 into the clutch 159, then returning by way of conductor 187 through the switch tube 117' of the second transformer-relay, and then through conductors 189 and 115, automatic switch 117 and conductors 119, 121, 124 through main switch 105 to the second main line L2.

For controlling the fuel feeder of the stoker, my sensitive coordinating stoker control instrument is mounted in any convenient location, and the temperature control conduit 69 extends from the Bourdon tube of the instrument through an outside wall 71 of the building for connection into a thermo-bulb 73, which is exposed to the free circulation of the outside atmosphere. As previously described, this arrangement sets up pressures variable as a function of the outside temperature, which pressures are applied in the Bourdon tube 27 of the instrument. The air pressure control conduit 25 connects from the air conduit 93 of the stoker and extends into the bell-element 3 of the control instrument, applying thereto the back pressure or static pressure of the air caused by the thickness of the fuel bed.

The rate of coal feeding is set, as by properly selecting the gear ratio, or the belt pulleys, so that it exceeds the maximum rate of combustion possible, and the thickness of the fuel bed therefore increases while the coal feeder is operating.

In operation to satisfy the heat load demand on the furnace, for a given outside temperature, my improved stoker control regulates the fuel feed to maintain the fire bed thickness practically constant by starting and stopping the coal feeder.

By reference to a particular case, the operation of the improved stoker control may be explained to more clearly illustrate the advantages obtained.

At an outside temperature of 30 degrees Fahrenheit above zero, it has been found that for a certain installation with a given fuel, a fuel bed thickness of 6 inches is desirable to maintain efficient combustion. When the air impeller was operating, the static pressure in the wind box was $\frac{6}{10}$ inch of water.

When the room thermostat calls for heat and starts both the coal feed and air flow to the tuyères, as previously described, the thickness of the fuel bed immediately begins to increase thereby causing a greater resistance to air flowing therethrough, which in turn increases the static pressure in the air supply conduit. After a relatively short interval of operation, the fire bed thickness has increased to 7 inches causing the static pressure to increase to $\frac{7}{10}$ inch of water. As this condition is attained, the static air pressure acting in the bell-element of my instrument sets up a force which co-acts with the effect of the Bourdon tube on the lever arm 11 of the control instrument to produce a resultant effect sufficient to close the switch 37. This opens the contacts of the transformer-relay 179 and deenergizes the electro-magnetic clutch stopping the coal feeder 89. The fuel bed thickness thus provided is that thickness which is proper for the best combustion conditions at the prevailing outside temperature which determines the average heat load on the furnace.

If the operating period of the blower was 15 minutes, then the operating time of the coal feeder was perhaps only the first 3 minutes. But if the operating time of the blower was 25 minutes, then the coal feeder would operate perhaps 3 minutes at the beginning of the cycle, and then off until the fuel bed burned down to a thickness of 6 inches, and then on again for five minutes. The thickness of the fire bed would be maintained between 6 and 7 inches assuming the response differential of the control instrument was set at a pressure variation of $\frac{1}{10}$ inch of water.

If the outdoor temperature should drop suddenly to zero the room would require a greater quantity of heat, and for better thermal efficiency the coal bed should be increased to a thickness of 10 inches. In accordance with my invention the operation of the stoker is modified by the effect of the Bourdon tube connected with the outside bulb and acting through the link on the regulator lever arm. By this arrangement the thickness of the fuel bed is increased to maintain the optimum combustion conditions as the heat load on the furnace increases.

Assuming that the outside temperature rises, then the effect on the system is just the opposite and the stoker is then operated to provide and maintain a thinner fuel bed.

It will be seen that I have provided a simplified means for and method of regulating the depth of a fuel bed and controlling the air supplied for combustion as some inverse function of the outside atmospheric temperature. In accordance with my invention, the wind-box air pressure of the stoker changes inversely as the outside air temperature, and the fuel feeding operating time varies with the wind-box pressure.

Thus when the outside temperature is fairly high and the needs for heat are slight, the wind box pressure is low and the fire bed is thin. Due to the thinness of the fire bed "blow holes" develop with greater frequency, dropping the pressure of the wind box, and causing the stoker to start up and operate momentarily until enough fresh fuel has been pushed up to close in the "blow hole", and thus causing the device to function as a fire maintaining device. Also this eliminates that condition wherein a large quantity of air is blown through large openings in the fuel bed and the oxygen does not have time or opportunity to combine with the fuel, and the fire is chilled by the excessive amount of air, and much heat is carried up the stack.

When the outside temperature is low, the wind-box pressure builds up to a higher level before the fuel feed mechanism cuts out, thus increasing the thickness of the fuel bed. With increased wind-box pressure the penetration of air into fuel bed is at a higher velocity. As the time of contact between air and the fuel required for combustion to take place is appreciable, the thickness of the combustion zone increases thus providing a greater body of fire and a reservoir of heat which is somewhat inversely proportional to the outside temperature.

Because the fuel feeding is controlled by the wind-box pressure which wind-box pressure is low for high atmospheric temperatures and high for low atmospheric temperatures, the development of blow holes is held to a minimum. One of the disadvantages inherent to small stokers of the type used in heating plants is the tendency for such blow holes to form and my invention provides for the immediate correction of this condition thus not only increasing the combustion efficiency of the furnace but also eliminating the tendency of small ash particles "fly ash" to be carried into the flues and stack and thus reduce the efficiency of the system.

In Fig. 6 I have disclosed another embodiment of my stoker control arranged for operation in response to the velocity of the air in the air supply conduit 93, rather than in response to the static pressure thereof as in the first embodiment. When the fuel bed gets thinner, the velocity of the air in the air supply conduit 93 increases. In this embodiment, the air control conduit 25, from the instrument, extends into the air supply conduit 93 with a tip bent to extend axially therein toward the air stream to convert the kinetic energy of the air stream to pressure varying as a function of the velocity of the air for operating the instrument.

A second air control conduit 191 extends into the air supply conduit 93 and is provided with a bent tip portion which extends axially therein in the down stream direction to provide pressures which are less than static whereby a maximum pressure differential is obtained for operating the control instrument. The second control conduit is connected into the vessel 1 of the control instrument above the level of the sealing liquid therein. This arrangement tends to raise the bell-element 3 when the air supply velocity increases, and to lower it as the velocity decreases which is just the opposite operation from the first embodiment of my control system. For this reason the bracket 15 and the pivot 13 which supports the lever arm 11 of the coordinating instrument are positioned on the opposite side of the cover providing an arrangement wherein the link 17 connects from the bell-element 3 to the lever arm 11 at a point on the opposite side from the connection of the Bourdon tube therewith.

Although air leakage occurs through the loose fitting aperture 19 in the cover around the link 17, it is relatively slight as compared with the air capacity of the air supply conduit which is of a relatively larger cross section.

A control magnet 43 is mounted on the down turned end of the lever arm 11 for controlling a magnetic mercury contact tube 37, as in the first embodiment, and from the Bourdon tube 27 the conduit 69 extends for connection with a thermobulb exposed to the outside temperature.

The variable distortion of the Bourdon tube applies variable effects, corresponding to outside temperatures, to the pivoted lever arm 11 which coordinates with the effects imposed thereon by the bell-element 3 as a function of the fuel bed depth. The resultant of the effects thus coordinated is applied for operating the switch 37 to make or break the circuit between the conductors 47 and 49 which extend for controlling the stoker-fired furnace 81, as previously set forth. By reversing the connections of the control conduits into the supply conduit 93, the instrument may also be used with the same pivot mounting as in Figs. 1 and 2, as will be understood. It will be understood that in either modification the clutch for driving the fuel feeder may be replaced by a magnetic pawl or a second electric motor, if desired.

By properly selecting the characteristics of the Bourdon tube and adjusting the slidable biasing weight, suitable response characteristics are obtained for different stokers, systems and fuels.

It is apparent that within the scope of my invention, modifications and different arrangements may be made other than therein disclosed, and the present disclosure is illustrative merely, the invention comprehending all variations thereof.

I claim:

1. In a stoker control system the combination of, a furnace, a fuel feeder for feeding solid fuel to provide a fuel bed therein, an air conduit for passing air through the fuel bed in said furnace, an air supply source for supplying air at super-atmospheric pressure into said air conduit, means for regulating the depth of the fuel bed as some inverse function of the outside atmospheric temperature comprising, control means responsive as a function of the outside atmospheric temperature, other control means responsive as a function of the air pressure in said conduit, and regulating means operatively responsive to both said control means for regulating the operation of said fuel feeder.

2. In a stoker control system the combination of, a furnace, a fuel feeder for feeding solid fuel to provide a fuel bed therein, an air conduit for passing air through the fuel bed in said furnace, air impeller means for supplying air at super-atmospheric pressure in said air conduit in accordance with the heat load demand on said furnace, control means operatively effective as a function of the outside temperature, other control means operatively effective as a function of the air pressure in said conduit, driving means for driving said fuel feeder, and feed regulating means responsive to both said control means for regulating the operation of said driving means to regulate the rate of fuel feeding to said furnace to vary the depth of fuel bed as some inverse function of the outside atmospheric temperature.

3. In a stoker control system the combination of, a furnace, a fuel feeder for feeding solid fuel to provide a fuel bed in said furnace, air conduit means arranged for passing air through the fuel bed in said furnace, air impeller means for supplying air at super-atmospheric pressure into said air conduit means to pass through said fuel bed, an enclosure heated by said furnace, a device responsive to the temperature in said enclosure for controlling the rate of air supply into said conduit means to regulate the rate of combustion and the temperature, control means responsive as a function of the outside atmospheric temperature, other control means responsive to the air in said conduit means in accordance with the thickness of the fuel bed, driving means for driving said fuel feeder, and regulating means responsive to both said control means for operating said driving means to feed fuel into the furnace and regulate the depth of the fuel bed therein as an inverse function of the outside atmospheric temperature.

4. A stoker control system comprising the combination set forth in claim 2 in which said driving means for driving the fuel feeder includes an electromagnetic clutch for operatively connecting the fuel feeder with the air impeller means, an energizing circuit for energizing the electromagnetic clutch, and circuit closing means controlled from said regulating means for operating the fuel feeder and regulating the depth of the fuel bed.

5. In a stoker control system the combination of, a furnace, a fuel feeder for feeding solid fuel to provide a fuel bed therein, air conduit means arranged for passing air through the fuel bed in said furnace, an air supply source for providing sufficient air in said air conduit means for inducing the required combustion, control means for regulating the operation of said fuel feeder comprising, a bell floating in a sealing liquid, a control conduit connecting from the inside of the bell to said air conduit means, a regulating member operated by said bell, control means connected to said member for applying a force variable as a function of outside temperature, and means controlled by said member for operating said feeder to regulate the fuel bed depth as some function of the outside temperature.

6. In a stoker control system the combination of, a furnace, a fuel feeder for feeding solid fuel to provide a fuel bed in said furnace, air conduit means arranged for passing air through the fuel bed in said furnace, an air supply source for supplying air into said air conduit means at super-atmospheric pressure, an enclosure heated by said furnace, means responsive to the temperature in said enclosure for controlling the air supply into said air conduit means to regulate the combustion in said furnace and the temperature in said enclosure, control means providing a force variable as a function of the outside temperature, additional control means producing a force variable as a function of the air flow resistance of the fuel bed, and control force coordinating means responsive to both said control forces for regulating the operation of said fuel feeder to provide a fuel bed of a proper depth variable as some inverse function of the outside atmospheric temperature.

7. In a stoker control system the combination of, a furnace, a fuel feeder for feeding solid fuel to provide a fuel bed in said furnace, air conduit means arranged for passing air through the fuel bed in said furnace, air supply means for supplying air under super-atmospheric pressure in said conduit means, means responsive to heat from said furnace for controlling said air supply means to regulate the rate of combustion, control means for providing a force variable as a function of the outside atmospheric temperature, other control means for providing a force variable as a function of the thickness of the fuel bed, a regulating member subjected to the simultaneous action of both of said forces for coordinating the effects thereof, and means controlled by said regulating member for operating said fuel feeder to provide a fuel bed the depth of which is variable for maintaining optimum combustion conditions at all times.

EDWARD G. CHAMBERS.